United States Patent Office 3,504,261
Patented Mar. 31, 1970

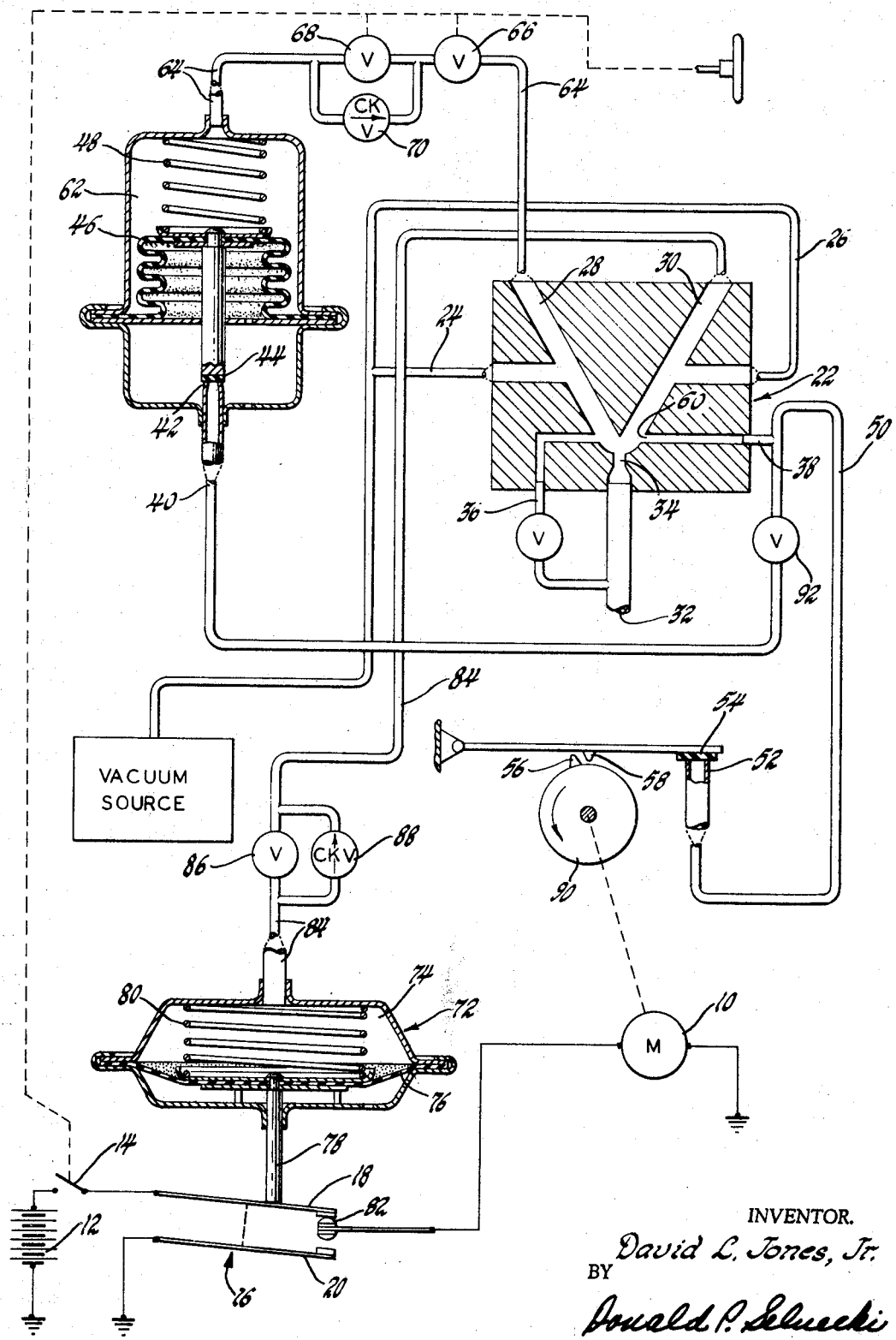

3,504,261
PULSE CONTROLLED WIPER
David L. Jones, Jr., Kettering, Ohio, assignor to General Motors Corporation, Detroit, Mich., a corporation of Delaware
Filed Jan. 3, 1967, Ser. No. 606,913
Int. Cl. H02p 1/04, 5/00
U.S. Cl. 318—444                                4 Claims

ABSTRACT OF THE DISCLOSURE

This disclosure concerns pulse type windshield wiping mechanisms wherein an electric motor is utilized to power the windshield wiper arm and blade assembly and wherein a vacuum powered fluid amplifier selectively directs a negative pressure in a controllable manner to various portions of the system to start the electric motor, allow a single speed wipe cycle, brake the electric motor at the end of one wipe cycle, and which delays the beginning of another wipe cycle in response to the amount of bleed allowed by a controllable valve to one leg of the fluid amplifier.

---

This invention relates to windshield wiping mechanisms and more particularly to a fluid amplifier controlled pulse wiper.

Pulse windshield wipers are a type that bring about a single speed movement of a windshield wiper arm across a windshield through one cycle and then delays future movements of the arm across the windshield. The delay between the wiping cycles is controllable as desired by a vehicle operator and, therefore, the frequency of wipes is selected by the vehicle operator to provide adequate wiping under various conditions. This is obviously a desirable feature in a windshield wiping system because more wipes per minute are desirable to maintain visibility during a heavy rain storm than are required under conditions when only a mist falls on the windshield. Methods of bringing about a pulsing windshield wiper are found in the prior art but they generally require rather involved mechanisms that are prohibitively expensive and not necessarily reliable or durable. Fluid amplifiers have no moving parts and are well known as being reliable and durable. The expense of the amplifier alone is negligible and relatively inexpensive components can be used therewith.

It is an object of the present invention to provide an improved pulse windshield wiper.

It is another object of the present invention to provide an improved pulse windshield wiper utilizing an "and" logic fluid amplifier as the control means.

It is still another object of the present invention to provide an improved pulse windshield wiper mechanism for an electrically operated wiper utilizing engine vacuum as a power source for a fluid amplifier control.

It is a further object of the present invention to provide a pulse wiping mechanism constructed in accordance with the last object which is easily controllable from the driving compartment of a vehicle.

It is still a further object of the present invention to provide an improved pulse windshield wiper which is electrically operated and which is automatically controlled in operation by a dynamic brake.

Further objects and advantages of the present invention will be apparent from the following description, reference being had to the drawing wherein a preferred embodiment of the present invention is clearly shown.

In the drawings:

In the single figure drawing, a pulse wiping system constructed in accordance with the present invention is diagrammatically shown.

Referring to the drawing, a windshield wiper drive motor 10 is shown as being powered by the battery 12 through an on/off switch 14 and controlled through a two pole control switch or element 16. With motor 10 energized through pole 18, the motor is energized for forward rotation and, when energized through pole 20, is dynamically braked.

A bistable fluid amplifier is generally designated by the numeral 22 and is powered by a vacuum source communicating pressure through lines 24 and 26 to legs 28 and 30, respectively. Atmospheric pressure is drawn through inlet 32 past power nozzle 34 to provide a power stream. A bias control circuit 36 can be preadjusted to get a desired memory characteristic to suit the exigencies of a particular installation.

A control port at line 38 is provided for amplifier 22 and provides "and" logic input for operation. Line 40 communicates with line 38 and has a nozzle 42 engageable by resilient valve 44 of a pressure responsive control valve means. Valve 44 is moved by diaphragm 46 on which it is mounted and normally closes nozzle 42 from communication with the atmosphere by virtue of the force exerted by spring 48.

Line 50 also communicates with line 38 and terminates in nozzle 52 which is normally closed by cam operated valve 54. Lobe 56 engages lobe 58 during rotation of motor 10 in a manner hereinafter described causing valve 54 to raise off its seat on nozzle 52 during a certain portion of a wiping cycle. Nozzle 52 communicates with the atmosphere. Restriction point or port 60 is designed to be sufficient to shift the fluid flow through the amplifier 22 from the outlet leg 30 to the outlet leg 28 only when nozzle 42 and nozzle 52 are uncovered and hence, in communication with the atmosphere. Therefore, the designation of the present amplifier is that of an "and" logic amplifier.

Chamber 62 above diaphragm 46 communicates with leg 28 of amplifier 22 through line 64. Situated in line 64 is an on/off valve 66 which mechanically operates in conjunction with switch 14. On/off valve 66 is in series with variable bleed 68 which is a dash control for the subject system. Bleed 68 is bypassed by check valve 70 which functions to control the rate of movement of diaphragm 46 in a manner hereinafter described.

A vacuum responsive means 72 has a power chamber 74 closed on one side by diaphragm 76, the chamber beneath the diaphragm 76 being in communication with the atmosphere. Diaphragm 76 carries switch actuator 78 which serves to selectively position control switch 16. Spring 80 is situated in power chamber 74 and biases diaphragm 76 in the direction of control switch 16 maintaining pole 18 in engagement with fixed contact 82. Power chamber 74 communicates with leg 30 of fluid amplifier 22 through line 84. The sensitivity of the system to acceleration of the vehicle, assuming the vacuum source to be the intake manifold of the vehicle engine, is regulated by valve 86 situated in line 84. One-way check valve 88 provides a bypass for valve 86 and functions to change the response of the movement of diaphragm 76 in one direction.

When it is desired to initiate a wiping cycle, on/off switch 14 is closed energizing motor 10 through pole 18 normally engaging fixed contact 82 and simultaneously on/off valve 66 is mechanically opened. Air entering inlet 32 flows through power nozzle 34 and also through bias control 36. This causes the power stream to attach to the wall in leg 30 resulting in leg 30 having less vacuum pressure therein than in leg 28. Leg 28 therefore has a greater relative vacuum than leg 30 and causes a negative pressure to be exerted on diaphragm 46. Diaphragm 46 moves upwardly drawing valve 44 off its seat on nozzle 42.

When motor 10 is energized, cam wheel 90 carrying lobe 56 rotates therewith in the direction of the arrow. This rotation has no effect on the system until lobe 56 engages lobe 58. This occurs just prior to the completion of a full cycle of the windshield wipers on the windshield. Lobe 56 engages lobe 58 driving valve 54 off its seat on nozzle 52 momentarily. This momentary opening of line 50 coupled with the open nozzle 42 satisfies the "and" logic requirement of amplifier 22 causing a shift of the power stream to leg 28. Leg 30 immediately is at a lower pressure than leg 28 resulting in a movement of diaphragm 76 which draws the bias of spring 80 which draws pole 20 into engagement with fixed contact 82. The forward motion of motor 10 is thereby arrested and dynamic braking occurs to bring the windshield wiper mechanism to a halt.

Fluid amplifier 22 will not reshift to leg 30 when valve 54 engages nozzle 52 due to built-in hysteresis. This, in effect, means that both nozzles 52 and 42 must be closed before the power stream shifts back to leg 30. The rate of movement of diaphragm 46 is controlled by the amount of bleed through variable bleed 68. As previously stated, this is a dash control regulatable by a vehicle operator and determines the delay between operating cycles. When nozzle 42 is again engaged by valve 44, a shifting of the power stream results to leg 30 which causes a loss of vacuum in line 84 and a repositioning of diaphragm 76 by spring 80 to the position shown in the drawing. Pole 18 reengages fixed contact 82 resulting in a reenergization of motor 10 and another sweep of the windshield wipers across the windshield is initiated. The subject system operates as a control for a pulse wiping mechanism in the manner previously described and can be calibrated to demonstrate a particular response rate by the preadjustment of bias control 36, valve 86 regulating the movement of diaphragm 76, and valve 92 regulating the input of the bias at point 60. It is clear that the subject system can be made as responsive as the designer of the particular windshield wiping system desires. When a system has been appropriately preadjusted, only variable bleed 68, subject to the control of the vehicle operator, need be adjusted to control the delay between cycles. This delay, in effect, is the pulsing control. Also, as will be apparent to those skilled in the art, the wiper control system inherently provides for continuous wiper operation when there is a loss of vacuum pressure, since the spring 80 will move switch element 18 to engage contact 82 to energize the motor 10 upon such occurrence.

While the embodiment of the invention as herein disclosed constitutes a preferred form, it is to be understood that other forms might be adopted.

What is claimed is:

1. A pulse windshield wiper control mechanism for intermittently energizing a windshield wiper motor to move a windshield wiper through a single cycle of operation each time it is energized and providing intervening rest intervals between successive cycles of operation of the windshield wiper comprising: a power source; a movable control element in operative circuit with said windshield wiper motor and which is movable between a first position in which it effects energization of said wiper motor and a second position in which it effects de-energization of said wiper motor; a vacuum responsive means for effecting movement of said control element from its first position towards its second position when vacuum pressure is communicated thereto; a vacuum source; and a control means for selectively communicating said vacuum responsive means with said vacuum source and atmospheric pressure to effect movement of said control element between its positions, said control means comprising a fluid amplifier having an inlet leg in communication with the atmosphere and a pair of outlet legs in communication with said vacuum source, one of said outlet legs also being in communication with said vacuum responsive means, first means including a first control port for constantly biasing the fluid stream flowing through said inlet leg toward said one outlet leg, and second means including a second control port for shifting the fluid stream flowing through said inlet leg to the other outlet leg for a predetermined time period at intermittent intervals, said second means including first and second valve means for controlling communication between the atmosphere and said second control port and effecting a shift of the fluid stream from said one outlet leg to said other outlet leg when both of said valve means are open, and delay valve means responsive to the fluid stream flowing through said other outlet leg to delay closure of one of said valve means for a predetermined time period to provide a rest interval between successive cycles of operation of the wiper motor.

2. A pulse windshield wiper control mechanism for intermittently energizing a windshield wiper motor to move a windshield wiper through a single cycle of operation each time it is energized and providing intervening rest intervals between successive cycles of operation of the windshield wiper comprising: an electrical power source; a movable switch element in operative circuit with said windshield wiper motor and which is movable between a first position in which it effects energization of said wiper motor and a second position in which it effects de-energization of said wiper motor; a vacuum responsive means for effecting movement of said switch element from its first position towards its second position when vacuum pressure is communicated thereto; a vacuum source; and a control means for selectively communicating said vacuum responsive means with said vacuum source and atmospheric pressure to effect movement of said switch element between its positions, said control means comprising a fluid amplifier having an inlet leg in communication with the atmosphere and a pair of outlet legs in communication with said vacuum source, one of said outlet legs also being in communication with said vacuum responsive means, first means including a first control port for constantly biasing the fluid stream through said inlet leg toward said one outlet leg, and second means including a second control port for shifting the fluid stream flowing through said inlet leg to the other outlet leg for a predetermined time period at intermittent intervals, said second means including first and second valve means for controlling communication between the atmosphere and said second control port and effecting a shift of the fluid stream from said one outlet leg to the other outlet leg when both valve means are open and thereby communicates said vacuum source with said vacuum responsive means to effect movement of said switch element towards its second position to de-energize the wiper motor, and delay valve means responsive to the fluid stream flowing through said other outlet leg to delay closure of one of said valve means for a predetermined time period to provide a rest interval between successive cycles of operation of the wiper motor.

3. A pulse windshield wiper control mechanism for intermittently energizing an electric windshield wiper motor to move the windshield wiper through a single cycle of operation each time it is energized and providing intervening rest intervals between successive cycles of operation of the windshield wiper comprising: an electrical power source; a movable switch element in operative circuit with said electric motor and which is movable between a first position in which it effects energization of the electric motor and a closed position in which it effects de-energization of the electric motor; a vacuum responsive means for effecting movement of said switch element from its first position towards its second position when vacuum pressure is communicated thereto; a vacuum source; and a control means for selectively communicating said vacuum responsive means with said vacuum source and atmospheric pressure to effect movement of said switch element from its first position towards its second position and from its second position towards its first position, respectively; said control means comprising a fluid amplifier having an inlet leg in communication with the atmosphere and a pair of outlet legs in communication with said vacuum source, one of said outlet legs also being in communication with said vacuum responsive means, first means including a first control port for constantly biasing the fluid stream flowing through said inlet leg toward said one outlet leg, second means including a second control port for shifting the fluid stream from said one inlet leg toward the other outlet leg for a predetermined time period at intermittent intervals, said second means including a first valve for controlling communication between said second port and the atmosphere, actuating means for effecting movement of said first valve between open and closed positions, means for communicating said other outlet leg with said actuating means, a second valve means for controlling communication between the atmosphere and said second port, said second valve means being normally closed but being momentarily movable to its open position in response to the windshield wiper approaching the end of its cycle of operation, said first valve means being movable towards its open position when the fluid stream is flowing through said one outlet leg of said fluid amplifier, said fluid stream being shifted from said one outlet leg to said other outlet leg when both of said first and second valve means are in their open position whereby vacuum pressure is communicated to the vacuum responsive means to cause the switch element to be moved from its first position towards its second position to de-energize the electric motor, said fluid stream being shifted from the other outlet leg to said one outlet leg when both of said valves are in their closed positions whereby the vacuum responsive means is placed in communication with the atmosphere which effects movement of the switch element from its second position towards its first position to re-energize the electric motor, and delay valve means for controlling the rate of bleed of atmospheric air from the other outlet leg to said actuating means when the fluid stream is flowing through said other outlet leg to allow movement of the first valve means towards its closed position, the rate of bleed determining the extent of the rest interval between successive cycles of operation of the motor.

4. A pulse windshield wiper control mechanism for intermittently energizing a windshield wiper motor to move a windshield wiper through a single cycle of operation each time it is energized and providing intervening rest intervals between successive cycles of operation of the windshield wiper comprising: an electrical power source; a manual switch means movable between closed and open positions and in operative circuit with said electric motor; a second switch means in operative circuit with said electric motor and in series with said first switch means, said second switch means being movable between a first position in which it effects energization of said electric motor and a second position in which it effects dynamic braking of the electric motor; vacuum responsive means for moving said second switch means from its first position towards its second position to effect dynamic braking of the electric motor when vacuum pressure is applied thereto and for effecting movement of said second switch means from its second position towards its first position when atmospheric air is supplied thereto; a vacuum source; and a control means for selectively communicating said vacuum responsive means with said vacuum source and atmospheric pressure to effect movement of said second switch means between its positions; said control means comprising a fluid amplifier having an inlet leg in communication with the atmosphere and a pair of outlet legs in communication with said vacuum source, one of said outlet legs also being in communication with said vacuum responsive means, first means including a first control port for constantly biasing the fluid stream flowing through said inlet leg toward said one outlet leg to communicate atmospheric pressure to said vacuum responsive means to effect energization of said electric motor when said manual switch means is in its closed position, second means including a second control port for shifting the fluid stream from said one outlet leg toward the other outlet leg for a predetermined time period at intermittent intervals, said second means including a first valve for controlling communication between said second port and the atmosphere, actuating means for effecting movement of said first valve between open and closed position, means for communicating said other outlet leg with said actuating means, a second valve for controlling communication between the atmosphere and said second port, said second valve being normally closed but being momentarily movable to its open position in response to the windshield wiper approaching the end of its cycle of operation, said first valve being moved towards its open position when the fluid stream is flowing through said one outlet leg of said fluid amplifier, said fluid stream being shifted from said one outlet leg to said other outlet leg when both of said first and second valve means are in their open position and thereby communicate said vacuum responsive means with vacuum pressure to move the second switch means to its second position to de-energize the electric motor and to dynamically brake the same, said fluid stream being shifted from the other outlet leg to said one outlet leg when both of said valves are in their closed positions and thereby communicate the vacuum responsive means with the atmosphere to effect movement of the second switch means towards its first position to re-energize the electric motor, and adjustable delay valve means for controlling the rate of bleed of atmospheric air from the other outlet leg to said actuating means when the fluid stream is flowing through said other outlet leg to effect movement of the first valve means towards its closed position, the rate of bleed determining the extent of the rest interval between successive cycles of operation.

References Cited
UNITED STATES PATENTS

| | | | |
|---|---|---|---|
| 3,110,056 | 11/1963 | Oishei | 15—250.12 |
| 3,351,836 | 11/1967 | Kearns | 318—443 |
| 3,380,655 | 4/1968 | Swartz | 235—201 |

ORIS L. RADER, Primary Examiner

THOMAS LANGER, Assistant Examiner